US007013778B1

(12) United States Patent
Lupke et al.

(10) Patent No.: US 7,013,778 B1
(45) Date of Patent: Mar. 21, 2006

(54) TUBE CUTTING DEVICE

(76) Inventors: Manfred A. A. Lupke, 92 Elgin Street, Thornhill (CA) L3T 1W6; Stefan A. Lupke, 32 Vintage Lane, Thornhill (CA) L3T 1X6

( * ) Notice: Subject to any disclaimer, the term of this patent is extended or adjusted under 35 U.S.C. 154(b) by 0 days.

(21) Appl. No.: 10/130,385

(22) PCT Filed: Nov. 10, 2000

(86) PCT No.: PCT/CA00/01320

§ 371 (c)(1), (2), (4) Date: May 14, 2002

(87) PCT Pub. No.: WO01/36167

PCT Pub. Date: May 25, 2001

(30) Foreign Application Priority Data

Nov. 12, 1999 (CA) .................................... 2289386

(51) Int. Cl.
*B26D 3/14* (2006.01)

(52) U.S. Cl. ....................... 83/304; 83/318; 83/698.61; 29/896.6

(58) Field of Classification Search ............... 29/896.6, 29/152, 493; 409/53.1; 82/53.1; 83/74, 83/304, 318, 698.61, 54, 340, 672, 592, 319, 83/507, 303, 178, 181, 700; 30/92–108; 401/152

See application file for complete search history.

(56) References Cited

U.S. PATENT DOCUMENTS

| | | | | |
|---|---|---|---|---|
| 3,821,912 | A * | 7/1974 | Howe | 83/54 |
| 3,916,763 | A * | 11/1975 | Maroschak | 409/172 |
| 3,957,386 | A * | 5/1976 | Lupke | 408/50 |
| 4,055,098 | A * | 10/1977 | Leloux | 83/309 |
| 4,112,810 | A * | 9/1978 | Dreibelbis | 83/490 |
| 4,486,929 | A * | 12/1984 | Dickhut et al. | 29/33 T |
| 5,655,427 | A * | 8/1997 | Infanger | 83/673 |
| 5,744,776 | A * | 4/1998 | Bauer | 219/121.7 |

* cited by examiner

*Primary Examiner*—Kenneth E. Peterson
*Assistant Examiner*—Phong Nguyen

(57) ABSTRACT

A device for cutting slits in plastic tubes produces a plurality of cuts spaced around tubing passed through the device. The device comprises a plurality of rotatable members (3) located at different circumferential positions around a tube passage (2) through the device. Each rotatable member is provided with a tube cutter (25) which is directed at and away from the tube passage (2) with rotation of each member (3). These rotatable members (3) are adjustable radially of the tube passage (2) for accommodating diametric variances in the tubing.

14 Claims, 3 Drawing Sheets

TUBE CUTTING DEVICE

FIELD OF THE INVENTION

The present invention relates to a tube cutting device for perforating tubing such as profiled drainage tubing.

BACKGROUND OF THE INVENTION

In some uses of plastic pipe, it is a requirement that the pipe be perforated. In one example only, underground profiled drainage pipe is provided with small cuts or slits spaced from one another around the troughs of the profiled pipe.

In the past, different devices have been either used or proposed for perforating such pipe. U.S. Pat. Nos. 4,180,357 and 4,218,164 both issued to Gerd Lupke disclose tube perforating devices in the form of a plurality of screw-like cutters rotatably mounted on fixed shafts around a center bore through which tubing is passed for perforation by the screw-like members. Although the devices in both of these patents are very efficient in operation, they are not easily adjusted for different tube diameters.

U.S. Pat. Nos. 5,381,711 and 5,385,073 both owned by Truemner et al, disclose tube perforators having driver cutter wheels supported by drive shafts at different positions around the perforators. According to both of these patents the drive shafts are at an angle, i.e. not parallel to the axis of the tube passed through the perforator. The angling of the drive shafts produces a tipping of the cutter wheels which, according to each of the patents, helps keep the wheels in the troughs of the tube and to accommodate very minor fluctuations in the tubing. In addition, according to each of these patents the driver cutter wheels are inter-changeable with other driver cutter wheels to accommodate more substantial variances in the tubing such as for example, tubing of different diameters.

SUMMARY OF THE PRESENT INVENTION

The present invention provides a tube cutting device which very quickly and easily adjusts for variances in tubing passing through the device whether those variances be as a result of different sizes of tubing or whether they be as a result of for example different tube sections such as coupling sections produced in the tubing which should not be cut.

In particular, the tube cutting device of the present invention which produces a plurality of cuts or slits around tubing passed through the device comprises a plurality of rotatable members located at different circumferential positions around a tube passage through the device. Each rotatable member is provided with a tube cutter which is directed at and away from the tube passage with rotation of each member.

In accordance with the present invention, the rotatable members are adjustable radially of the tube passage for accommodating diametric variances in the tubing passed through the device.

According to an aspect of the present invention a plurality of the tube cutters and in some cases all of the rotatable tube cutter members are responsive to a single controller which produces simultaneous uniform radial adjustment of all of the members.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
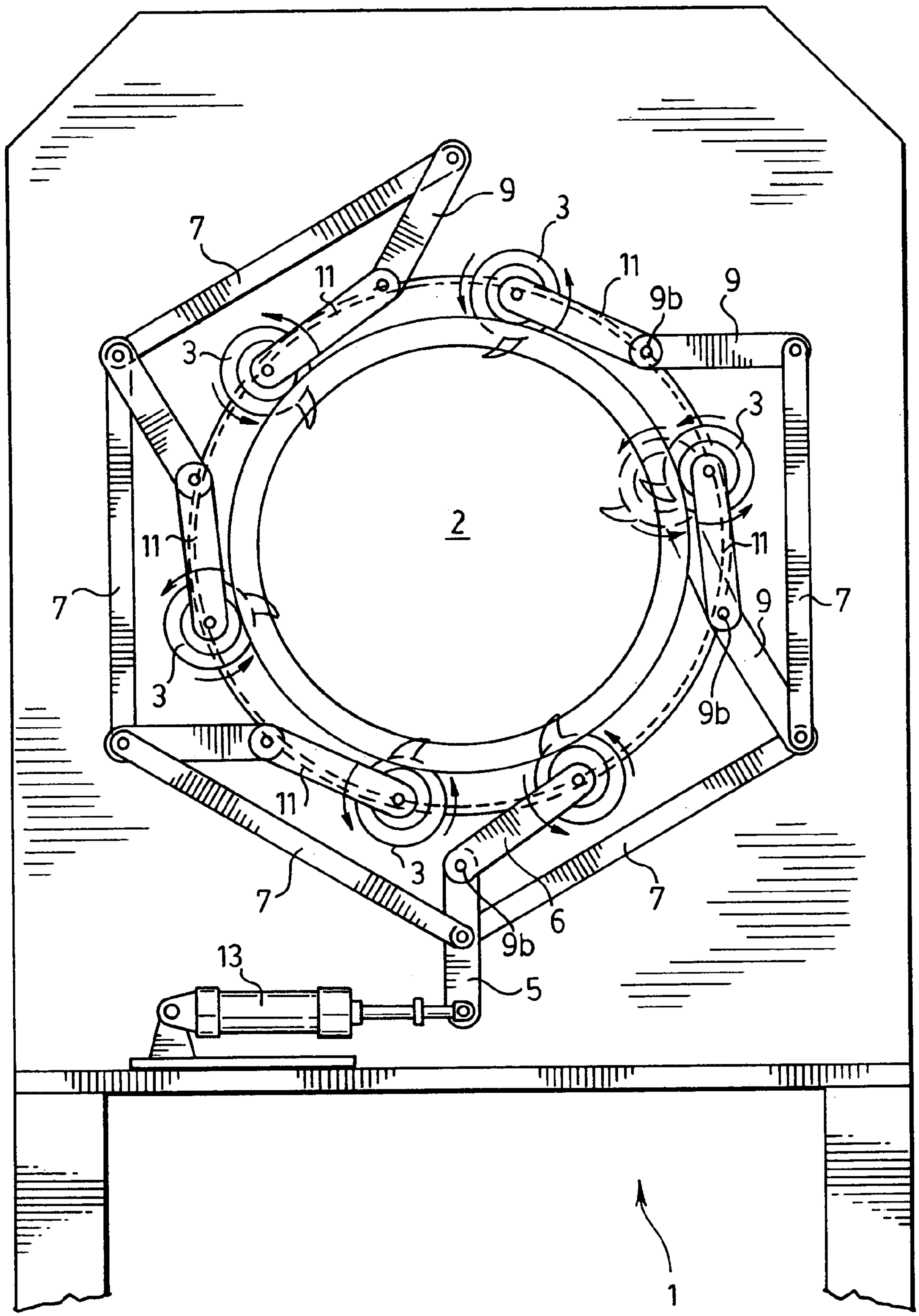
FIG. 1 is a sectional view through a tube cutting device according to a preferred embodiment of the present invention.

FIG. 1 shows a cutting device generally indicated at 1 for cutting tubing and in this case profiled plastic tubing passed through the device. The tube cutting device includes a plurality of individual cutting stations 3 at circumferentially spaced positions around a central tube passage or bore 2 through the device.

The details of each of the tube cutting stations 3 are better shown in FIG. 2 of the drawings and will be described later in detail.

Returning to FIG. 1 the key to the present invention lies in the radial adjustability of each of the cutting stations 3. In the particular example shown, this adjustability is provided through a mechanical linkage system comprising a plurality of levers pivotally interconnected to one another.

More particularly, the linkage system comprises a main or master lever 5 which, through a single movement of this lever controls a plurality of slave levers to produce simultaneous uniform radial adjustment of each of the cutting stations. These slave levers comprise slave lever 6 which is fixed to the main lever 5. The main lever 5 is pivotally attached to the frame at the fixed pivot 9*b*. A plurality of additional slave levers 7 are positioned outwardly around the device. As can be seen in FIG. 1, two of these slave levers pivotally connect centrally of the master lever 5.

Further slave levers 9 pivotally connect to the ends of levers 7. Slave levers 9 are pivotally attached at the fixed pivots 9*b* to the frame intermediate their length as shown in FIG. 1 and the cross section of FIG. 2. Each slave lever 9 includes a fixed arm 11 with the cutting station 3 attached at the end of arm 11. Slave lever 9 and the fixed arm 11 form a rocker arm arrangement pivoting about the fixed pivot 9*b*. Inward movement of the cutting station is shown in dashed lines in FIG. 1. The one minor difference in the overall set up is found where slave lever 6 which as noted above is pivotally connected to the interior end of master lever 5 is used to support the cutting station 3*a*. The actual construction of cutting station 3*a* is identical to the cutting stations 3.

Master lever 5 is pivotally connected at its outer end to a reciprocating plunger 13.

Movement of the plunger in one direction, i.e. outward extension of the plunger, acts directly on the master lever which in turn causes movement of all of the slave levers to pull each of the cutting stations outwardly from the position shown in FIG. 1. The degree of extension on the plunger dictates the degree of movement of the cutting stations. For example, the plunger can be extended sufficiently far to pull the cutting stations completely away from the center bore 2 which would allow something as large as a coupling section of the tube to pass through the device without coming into contact with the cutting stations. The cutters can also be pulled outwardly to cut larger diameter tubing.

If it is desired to pull each of the cutting stations radially inwardly from the FIG. 1 position to cut for example smaller diameter tubing, again a single movement of plunger 13, i.e. retraction of the plunger produces uniform inward adjustment of the cutting stations through the master and slave levers of the linkage system.

Figure 2:
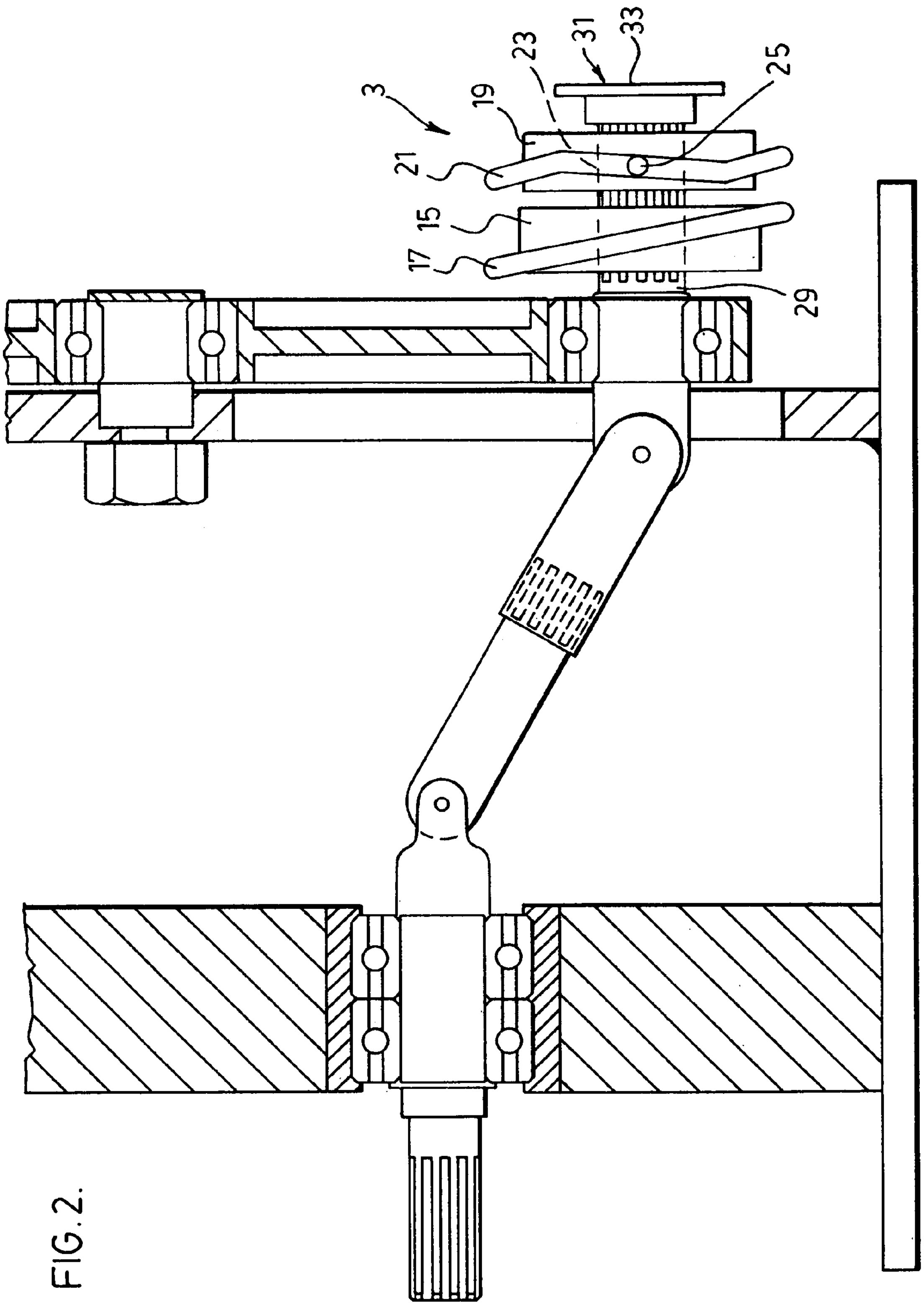
FIG. 2 is an enlarged sectional view of one of the individual tube cutting stations from the device of FIG. 1.

As noted above, one of the individual cutting stations 3 is well shown in FIG. 2 of the drawings. This cutting station comprises both a means for driving the tube through the device as well as a means for cutting the tube. This concept is similar to that disclosed in the two earlier Lupke patents although the actual construction of cutting station 3 is novel to the present invention.

More particularly, cutting station 3 comprises a first disk like member 15 having a thread 17 on an exterior surface of the disk. A second disk-like member 19 is located in a downstream position relative to the first disk like member. The exterior surface of disk 19 is provided with a helical thread portion 21 which wraps partially around the disk. This helical thread portion 21 is intersected by a rib portion 23 supporting the actual tube cutter 25.

As well shown in FIG. 2 of the drawings, rib portion 23 is straight rather than having the helical configuration of the thread portion 21. Accordingly, the rib portion lies at 90° to the axis of the tubing passing through the device and the cut produced by cutter 25 is produced in the same direction.

Disk member 15 and 19 are mounted on a common rotating support 29. The disk 15 is fixed while the disk 19 is movable longitudinally of that support. As such, disk 15 and specifically the thread 17 on this fixed disk engages within the troughs of the profiled pipe and the rotation of the disk, because of the pitch on the thread pushes the pipe through the device.

At the same time, the thread portion 21 on the disk 19 also engages in the troughs of the pipe. However, because of its movable feature, this disk will slide in a downstream direction on support 29 as it is rotated by the thread meshing with the pipe.

The disk 19 will rotate into position such that the rib portion 23 and the cutter 25 supported by the rib portion moves into the trough. As a result of the disk moving with the pipe, the cutter will perform the desired right angle cut without any resistance to the pipe movement through the device.

Once the cutter 25 has cleared from the trough with the rotation of disk 19 to complete the pipe cut in this particular area, disk 19 will return in a downstream position adjacent disk 15 to perform a new cutting operation on the next trough presented to it. This occurs as a result of two things. Firstly, a spring 30 is provided on the downstream end of disk 19 and this spring is trapped in position by means of an end stop 33 one support 29. This end stop holds the entire assembly together.

Secondly, the pitch of thread portion 21 on disk 19 is such that after the cut has been made, disk 19 threads itself under the influence of spring 30 back towards disk 19 as it engages within the next trough of the pipe. This action is again similar to that described in U.S. Pat. No. 4,218,164.

As is also described in both U.S. Pat. Nos. 4,180,357 and 4,218,164 all of the cutting stations 3 may be rotated at the same time by a single drive belt for all of the cutting stations. This drive belt will wrap in opposite directions around adjacent rotatable supports of the cutting stations to drive the adjacent stations in opposite directions preventing tube rotation within the device. Additional means such as a soft tube grip may also be provided to help hold the tube against rotation while it is being cut.

Figure 3:
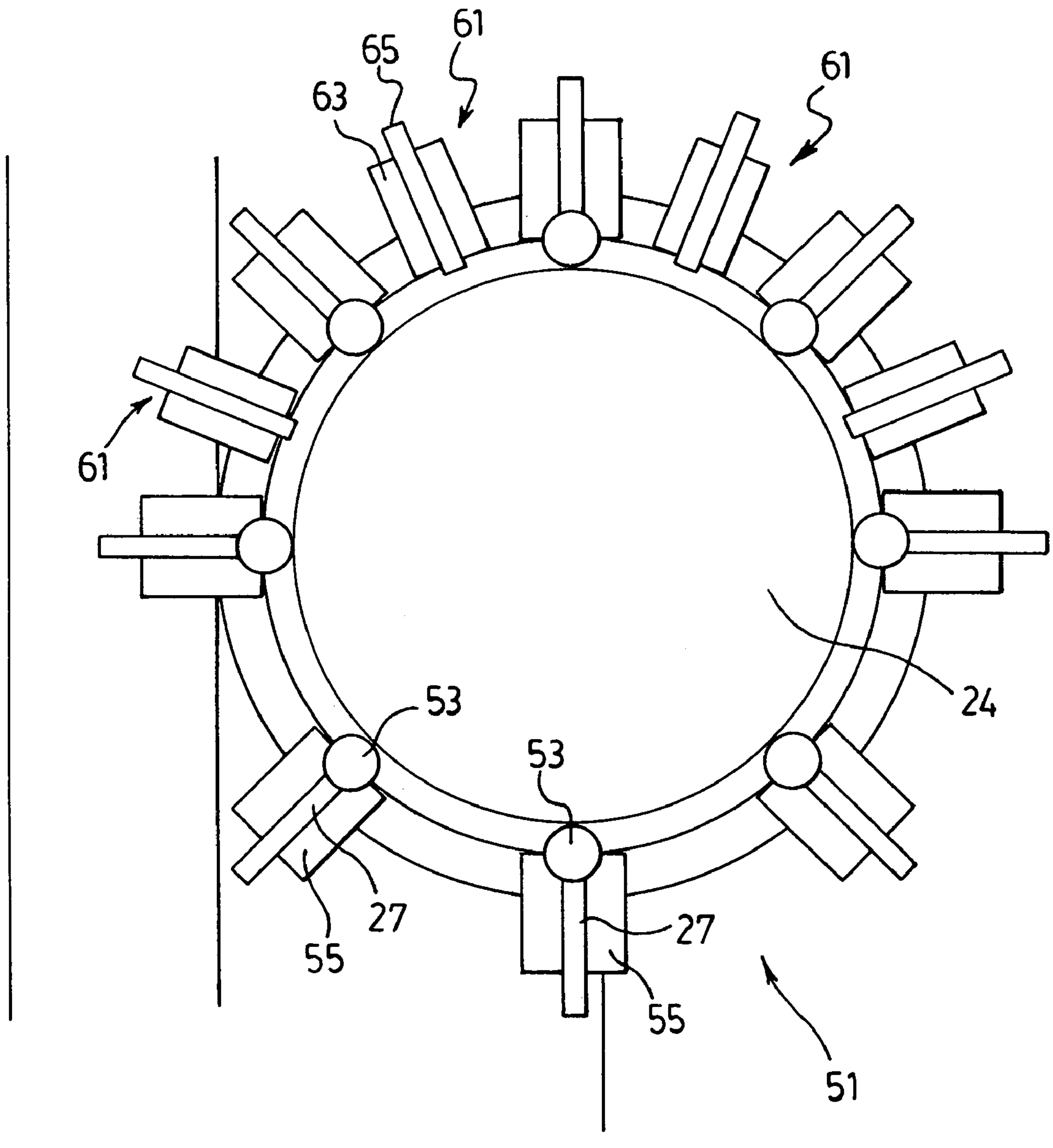
FIG. 3 is a sectional view of a tube cutting device according to a further preferred embodiment of the present invention.

FIG. 3 of the drawings show a modified tube cutting device generally indicated at 51. This device includes a plurality of rotary tube cutting stations with tube cutters 53 at circumferentially spaced locations around a center tube passage 24 through the device.

In this particular case the tube cutters 53 rather than being radially adjustable by a pivotal linkage system move in and out relative to passage 24 by a radially directed slide adjustment. In particular each of the cutters 53 is rotably supported on a mount or bar 27 supported by a frame 55. The bar 27 slides in and out of the frame for the radial adjustment of the tube cutters.

In the embodiment shown in FIG. 3, operation of the slide system is controlled by an electronic controller 29. This controller is fed impulses by sensing means on the surface of the tubing which feed information to the controller for its operation.

For example, the sensors would pick up the approach of a large diameter tube region such as a coupling whereby the controller would cause the tube cutters to pulls outwardly away from the cutting position thereby allowing the coupling section to pass through the device. Similar sensors could be used to operate the mechanical control system earlier described.

Again, with the device of FIG. 3, like the device of FIG. 1 all of the cutters may be adjusted simultaneously and uniformly with one another.

According to another aspect of the invention, it would only be required to move some of the cutters into a cutting position while either retracting or holding the other cutters away from the cutting position. For instance, it may only be required to cut the bottom portion of the tube. This can also be accomplished using cutting device 51 where the control would cause the cutters in the top part of the device to move radially outwardly from the cutting position. The cutters in the lower part of the device would not be moved.

Also for this situation, means are provided to prevent pipe rotation which would otherwise occur because of the imbalance in the cutting area. These means are in the from of tube grips 61 which include a housing 63 and a soft tip plunger 65 which is moved radially inwardly against the tube to hold it against rotation.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A tube cutting device for producing a plurality of cuts around tubing which has a profiled exterior surface and which is passed through the device, said device including a plurality of cutting stations located at different circumferential positions around a tube passage through said device, said cutting stations being radially adjustable to different radially adjusted cutting positions relative to said tube passage to accommodate cutting of different tube diameters, each cutting station comprising a power driven mounting shaft having a threaded means rotatable therewith and slidable along said mounting shaft, said threaded means including a changing pitch profiled exterior surface for pushing the tubing through said device and moving said threaded means on said shaft between an upstream position and a downstream position as a function of a drive speed of said power driven mounting shaft, said threaded means including a cutting member extending from one side of said threaded means, said changing pitch profiled exterior surface being sized to engage the profiled exterior surface of the tubing and causing said cutting member to move into and away from a cutting position at the tubing and to move said threaded means and said cutter along the mounting shaft axially of the tube passage at the speed of said tubing during engagement of said cutting member with said tubing; said changing pitch profiled exterior surface of said threaded means, the drive speed of said drive shaft and the profiled surface of the tubing cooperating to move said threaded means along the mounting shaft between said upstream position and said downstream position axially of the tube passage; and wherein at least some of said cutting stations include a common linkage arrangement for common movement of the radial position of said cutting stations from a cutting position to a clear position; wherein each mounting shaft includes a bearing arrangement supporting said mounting shaft intermediate its length to define a cantilevered tree end of said mounting shaft with a spring arrangement captured on said cantilevered end, said spring arrangement cooperating with said mounting shaft to exert a bias force on said threaded means urging said threaded means towards said upstream position, said spring arrangement moving said threaded means to said upstream position when said cutting stations are moved to a clear position.

2. A tube cutting device as claimed in claim 1 wherein said mounting shafts of the cutting stations remain parallel to a longitudinal axis of said tube passage in all radially adjusted positions of the cutting stations.

3. A tube cutting device as claimed in claim 2 including control means which produces simultaneous uniform radial adjustment of a plurality of said cutting stations.

4. A tube cutting device as claimed in claim 1 including control means which produces simultaneous uniform radial adjustment of a plurality of said cutting stations.

5. A tube cutting device as claimed in claim 4 wherein said control means comprises a mechanical linkage system including a main lever and a plurality of slave levers totally connected to one another, said mounting shafts of said cutting stations being pivotally supported by said slave levers with all slave levers pivotting with one another through a single adjustment of said main lever and producing a corresponding radial adjustment of each cutting station.

6. A tube cutting device as claimed in claim 5 wherein said main lever is operated by a reciprocating plunger.

7. A tube cutting device as claimed in claim 4 wherein said control means comprises an electronic controller.

8. A tube cutting device as claimed in claim 4 including a tube profile sensor upstream of said tube cutting device for detecting a change in pipe profile and a control arrangement for moving said cutting stations to said clear position as the sensed changed in pipe profile passes through said cutting stations.

9. A tube cutting device as claimed in claim 8 wherein the radial position of all of said cutting stations are controlled by a common linkage, said linkage including an adjustable actuator that controls the position of said cutting stations outwardly of the tubing through said common linkage, said control arrangement using said tube profile sensor to move said cutting members to said clear position when a coupling profile of the tube pipe is sensed and the coupling profile is passing through said tube cutting device and returning said cutting members to a cutting position in contact with said tube pipe after said coupling profile leaves said tube cutting device.

10. A tube cutting device as claimed in claim 9 wherein each cutting station includes a bearing rotatably supporting said mounting shaft at one end thereof and said threaded means is supported on a cantilevered end of said mounting shaft.

11. A tube cutting device as claimed in claim in claim 10 wherein each mounting shaft includes a spring arrangement captured on a cantilevered end of the mounting shaft that engages said threaded means and provides a spring bias urging said threaded means towards said upstream position.

12. A tube cutting device as claimed in claim 1 wherein some of said cutting stations are adjustable independently of others of said cutting stations to allow said some of said cutting stations to be moved to one of the cutting positions while the others of said cutting stations are held away from one of the cutting positions and said device including tube grip means to prevent tube rotation in said device while said some of said tube cutters are in the one of the cutting positions.

13. A tube cutting device as claimed in claim 12 wherein said tube grip means is also adjustable radially of said tube passage to accommodate the different tube diameters.

14. A tube cutting device as claimed in claim 1 including a tube profile sensor upstream of said tube cutting device for detecting a change in pipe profile that does not require cutting and a control arrangement for moving said cutting stations to said clear position as the sensed changed in pipe profile passes through said cutting stations.

* * * * *